United States Patent [19]
Roland

[11] Patent Number: 5,171,112
[45] Date of Patent: Dec. 15, 1992

[54] KEY CUTTING APPARATUS

[75] Inventor: Manfred W. Roland, Mountain View, Calif.

[73] Assignee: Maromatic Company, Inc., Mountain View, Calif.

[21] Appl. No.: 812,917

[22] Filed: Dec. 26, 1991

[51] Int. Cl.⁵ .............................................. B23C 3/35
[52] U.S. Cl. .................................... 409/81; 51/273; 409/137
[58] Field of Search ................... 409/81, 82, 83, 137; 408/67; 51/273

[56] References Cited

U.S. PATENT DOCUMENTS

| | | |
|---|---|---|
| 2,516,840 | 8/1950 | Allen, Jr. et al. ................ 409/137 |
| 2,711,061 | 6/1955 | Fegert ................................... 51/273 |
| 3,322,037 | 5/1967 | Cavagnero . |
| 3,837,383 | 9/1974 | Ko . |
| 4,750,536 | 6/1988 | Grisley . |
| 4,825,736 | 5/1989 | Catanese . |
| 4,946,322 | 8/1990 | Colligan . |

OTHER PUBLICATIONS

Maromatic Company Literature Distributed in 1989 and Showing Machine Sold in 1989.

*Primary Examiner*—Daniel W. Howell
*Attorney, Agent, or Firm*—Larson and Taylor

[57] ABSTRACT

A key cutting apparatus having an arrangement for assuring substantially complete removal of cutting chips. A rotary cutting blade which engages a clamp held key is housed within an outer housing which is connected to a vacuum tube to draw off chips. In the front, in the vicinity where the cutting blade engages the key, a pair of sliding doors are provided, one on each side of the housing. These doors are spring biased forwardly into mating engagement with the front jaw surfaces of the clamp to seal off the two sides while permitting continued forward movement of the cutting blade, under the action of the spring, to effect cutting of the key. A flap may be provided to close off the top of the space between the two doors.

6 Claims, 4 Drawing Sheets

KEY CUTTING APPARATUS

FIELD OF THE INVENTION

This invention relates to the manufacture of keys, primarily cutting edge notches in keys, and it relates in particular to improvements in removal of cutting chips formed during the cutting operation.

BACKGROUND OF THE INVENTION

In the manufacture of keys, it is known to bring a clamp mounted key and a cutter, for example, a rotary cutting blade, into operative engagement with each other to form notches in the edge of the key. The cutter moves, relative to the key, towards and away from the key to cut a notch and also parallel to the edge of the key while the cutter is spaced away from the key to position the cutter to move inwardly to cut another notch in the key.

A particular problem associated with key cutting concerns the cutting chips formed by the cutting operation. The chips range in size from relatively discrete pieces down to fine particles in the form of dust. However, for convenience, this application will use the term "chips" generically to cover the full range of sizes of such particles.

These cutting chips present a very significant problem associated with the cutting operation. The chips accumulate quite rapidly into a pile of debris which is extremely messy and which extend over a relatively wide area since the chips are thrown out with a relatively high velocity. Thus, the chips constitute a very significant mess which must be cleaned up periodically.

Also, chips affect reliability of the key cutting operation itself. The keys are very precisely positioned within the clamp to assure perfect positioning of each edge notch. If a chip thrown out from the cutting operation gets into an empty clamp located an another station of the apparatus where the key has been removed, that chip would cause the subsequent key placed in that clamp to be misaligned, resulting in a rejected key. Moreover, these chips contaminate the machinery at adjacent stations. The smaller chip particles might be sucked into air valves and the like at these other stations. Also, these chips represent a safety hazard to an operator in the vicinity of the apparatus, particularly if the chips are thrown into the operator's eyes.

The problem of chip removal has been recognized heretofore. Until now, the problem has been partially solved with an apparatus as shown in FIG. 1. In accordance with this prior, partial solution a housing is placed around the cutting blade so as to enclose most of it and a vacuum tube has been provided for removing chips which collect in the housing.

However, this prior arrangement, while satisfactory up to a point, has not solved the problem. In this prior art arrangement, the open area at the front, in the vicinity where the cutting blade engages the chip is still relatively wide open and a very significant volume of chips are thrown out at that area. Quantitatively, the prior arrangement does collect a majority of the chips, perhaps 80–90% of the chips. However, the remaining 10–20% of chips have still caused considerable problems, requiring at least a daily clean up of the area.

Thus, there exists a need for improvements for more efficiently and effectively removing chips which are created during a key cutting operation.

SUMMARY OF THE INVENTION

Thus, it is a purpose of the present invention to provide a new and improved apparatus which more effectively and completely removes chips created during a key cutting operation.

In accordance with the present invention, this purpose is achieved by providing arrangement which effectively closes off the sides of the immediate vicinity where the cutting blade engages the key, and does so while permitting the relatively complex movements of the cutting blade relative to the key, i.e. towards and away from the key and parallel to the edge thereof.

In a preferred arrangement, this purpose is accomplished by providing a pair of sliding doors, one on each side of the housing. These doors are spring biased towards the key and clamp up to a limit determined by a stop means connected to the housing. When the cutting blade and housing move towards the key to effect a cutting operation, the front edges of the doors, which are shaped to mate with the front jaw surfaces of the clamp, do in fact mate therewith, limiting forward movement of the doors themselves while permitting continued forward movement of the cutting blade into the key against a spring bias between the housing and each sliding door. There is thus provided an effective closing off on each side of the space in the vicinity where the cutting action takes place.

In addition, the present invention may utilize a flap coming down from the top front of the housing to close off the space above and between the two doors. No similar flap is necessary at the bottom of the doors since the cutting blade cuts upwardly through the key, so that the chips are carried upwardly and do not fall downwardly.

The sliding doors are preferably in the form of plates which move back and forth by means of elongated slots mounted on pins connected to the housing. The two doors, one on each side, may be connected together by suitable spacers.

The sliding doors are preferably mounted in indented portions of each sidewall of the housing, on the outer side thereof, such that thin walled portion forming the base of these indentations cover the space rearwardly of the sliding doors as they slide forwardly.

The chip removal system of the present invention has been found to virtually eliminate the chip problem. Even though the prior art arrangement of FIG. 1 carried away most of the chips, the remaining chips still required daily clean up of the work area and created the other problems discussed above. By contrast, with the present invention very close to 100% of chips are removed through the housing and the need to clean up the work area has been reduced to approximately once a month rather than once a day.

Thus, it is an object of the present invention to provide a key cutting apparatus with substantially improved chip removal capabilities.

It is still another object of the present invention to provide a key cutting apparatus wherein chip removal is substantially improved by providing sliding doors to essentially close off the sides in the vicinity where the cutting blade engages the key while concurrently permitting the necessary relative movements between the cutting blade and the key.

It is still another object of the present invention to provide a new and improved vacuum removal arrangement for a key cutting operation comprising a pair of sliding side doors which, under the action of a spring, mate with the front jaw surfaces of the key clamp to close off the sides in the vicinity where the cutter engages the key.

These and other objects of the present invention will become apparent from the detailed description to follow.

BRIEF DESCRIPTION OF THE DRAWINGS

There follows a detailed description of preferred embodiments of the present invention which are to be read together with the accompanying drawings wherein.

DETAILED DESCRIPTION OF THE PREFERRED EMBODIMENTS

Figure 1:
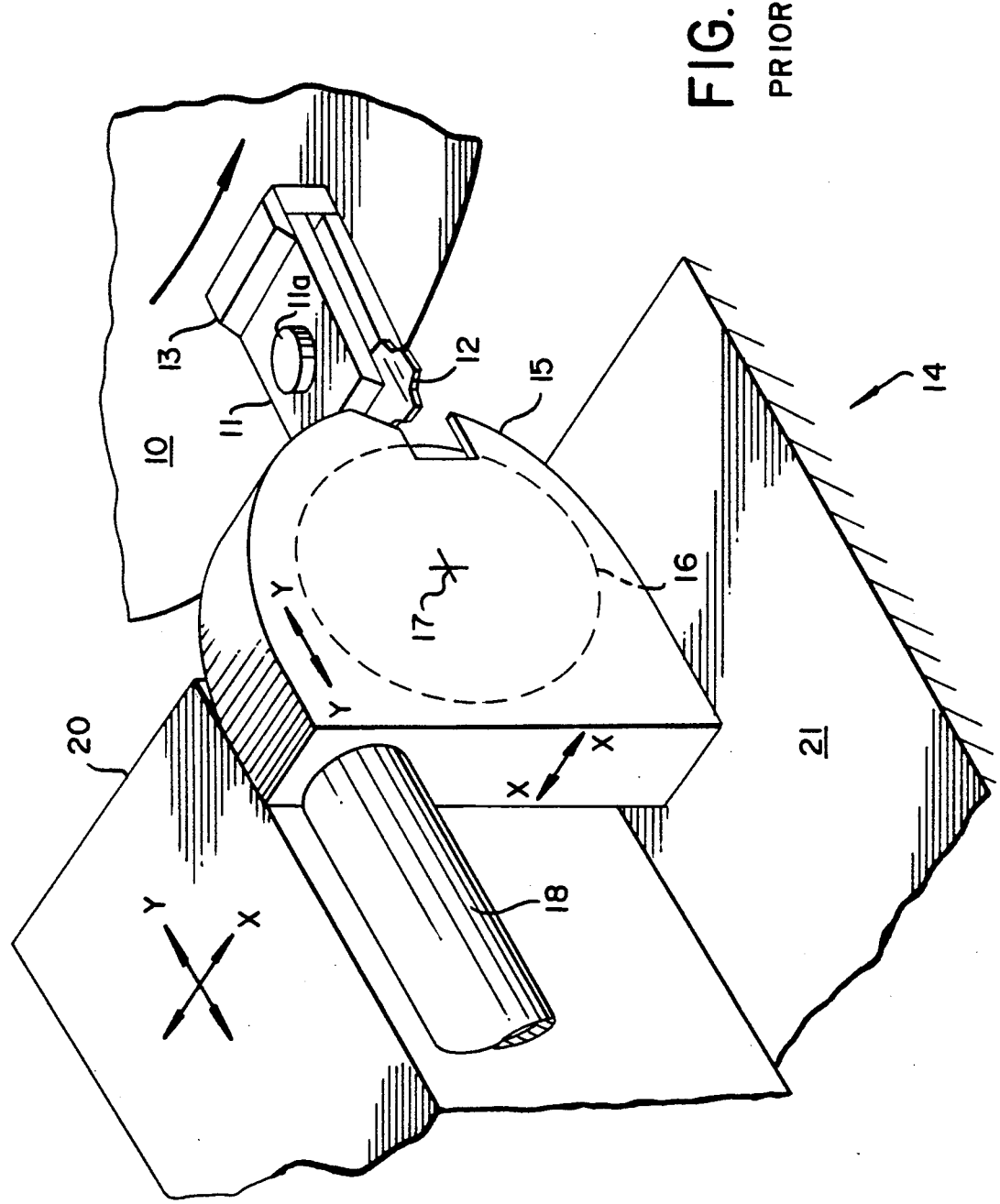
FIG. 1 is a perspective view of that portion of a key manufacturing apparatus at which the key is cut and showing a prior art key cutting and chip removal arrangement.

Referring now to the drawings, like elements are represented by like numerals throughout the several views.

One apparatus for manufacturing keys comprises a turntable 10 having clamps 11 thereon for mounting the keys 1 and carrying the keys to a plurality of different work stations located around the periphery of the table. For example, the keys would be loaded at a first station, cut at a subsequent station and thereafter have the burrs removed at other stations. At the last station the key would be removed and carried away. FIG. 1 illustrates only that portion of an overall key making apparatus showing the station at which cutting of the key takes place, specifically, cutting of the coded notches into an edge of the keys. This portion of turntable 10 carries clamp 11, firmly holding the key 12 between a pair of jaws held together by a bolt 11a which passes through the top jaw and would threadingly engage a threaded opening in the bottom jaw to pull the two jaws together. The entire clamp structure is held on the turntable 10 by a suitable structure such as post 13.

When a key reaches this key notch cutting station 14, it is positioned to have the notches cut therein by a rotary cutting blade 16. This blade is mounted on a shaft, the axis 17 of which is indicated in FIG. 1. This shaft extends into the spindle block 20 which is mounted on a platform 21 for movement in the X direction parallel to the edge of the key and in the Y direction into and away from the key. The cutting blade 16 is almost completely enclosed in a housing 15, open only at the front, and a vacuum chip removal tube 18 is connected to a vacuum source for removing chips which accumulate within the housing 15.

FIGS. 2-7 illustrate a modification of the prior art arrangement of FIG. 1 to include the features of the present invention.

There is provided on each side of the housing 15 a sliding door in the form of a plate 25. This plate 25 fits within a recess formed in each outer side surface of housing 15, the bottom of this recess being formed by thin walls 29, i.e. thinner than the remainder of the housing, the sides of this recess being opened toward the turntable 10 and otherwise formed by a pair of upper and lower walls 24 and a rear wall 26.

Each plate 25 includes a blind hole 28 in the rear thereof which receives therein a spring 27 which at its other end is secured to and bears against the rear wall 26. These springs bias the plate 25 to the right, towards the key. The plates include elongated slots 30 which are mounted on mounting pins 31 fixed to the housing 15, specifically, to the thin wall portion 29 thereof.

Figure 6:
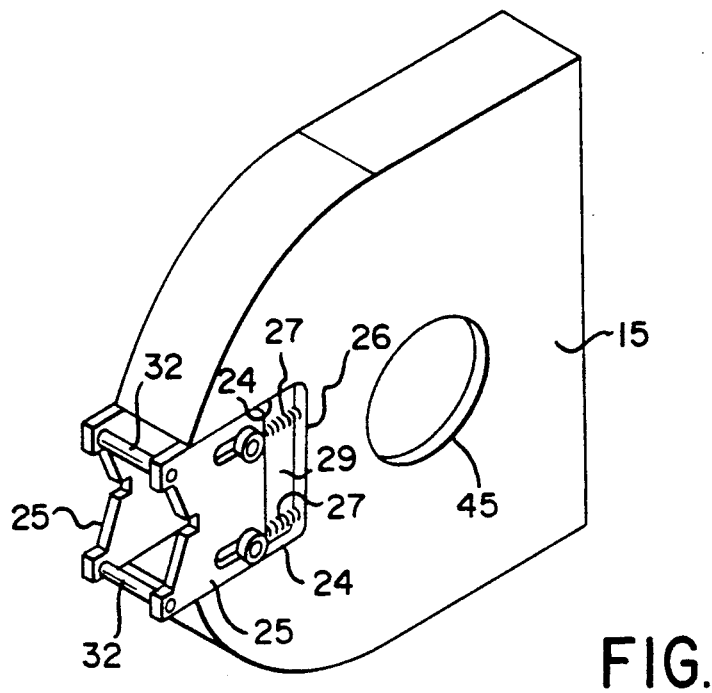
FIG. 6 is a partial perspective view of a portion of the invention, viewed from the side opposite to FIG. 2.
Figure 7:
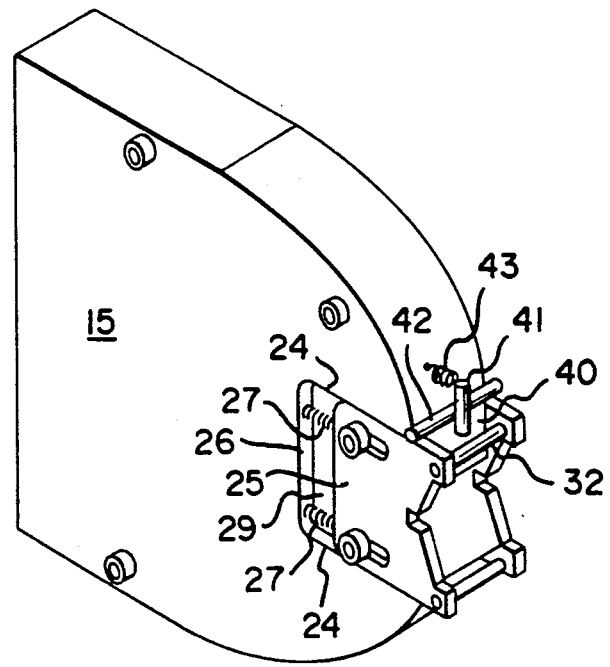
FIG. 7 is a partial perspective view similar to FIG. 6 but viewed from the same side as is visible in FIG. 2.

The front of each plate 25 includes a central key slot 35 which permits the key to move to the cutter and a pair of ramps 36 which are shaped to mate with the front jaw surfaces 37 of the clamp 11. As best seen in FIGS. 6 and 7, the two doors are suitably connected together by spacer bars 32.

Figure 2:
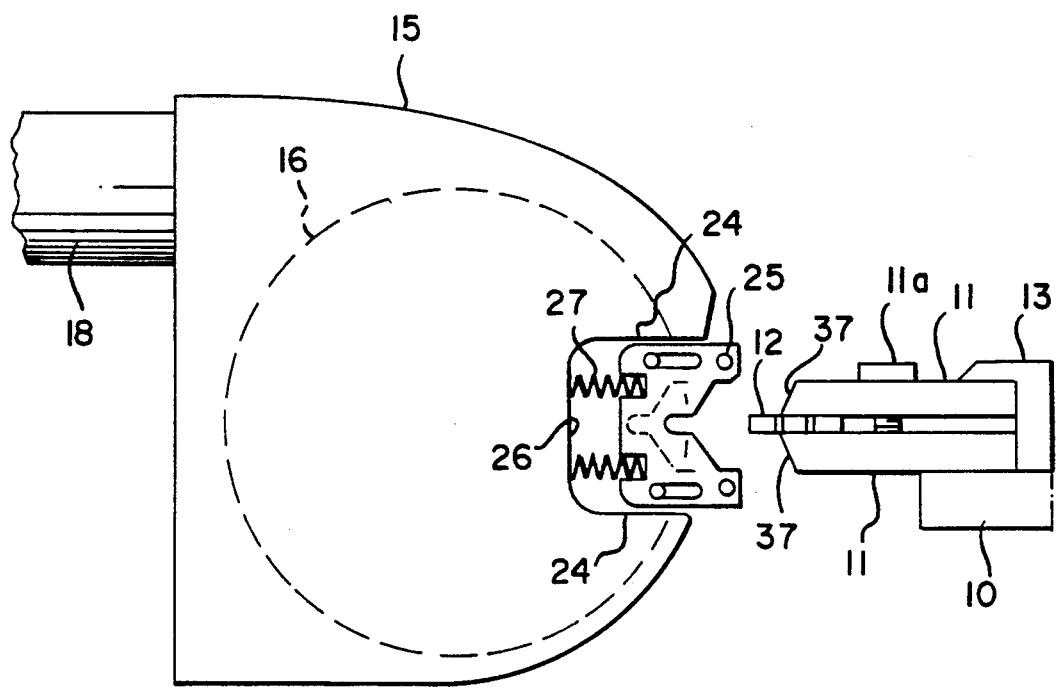
FIG. 2 is a side elevational view of a portion of FIG. 1, but modified to show the present invention.
Figure 3:
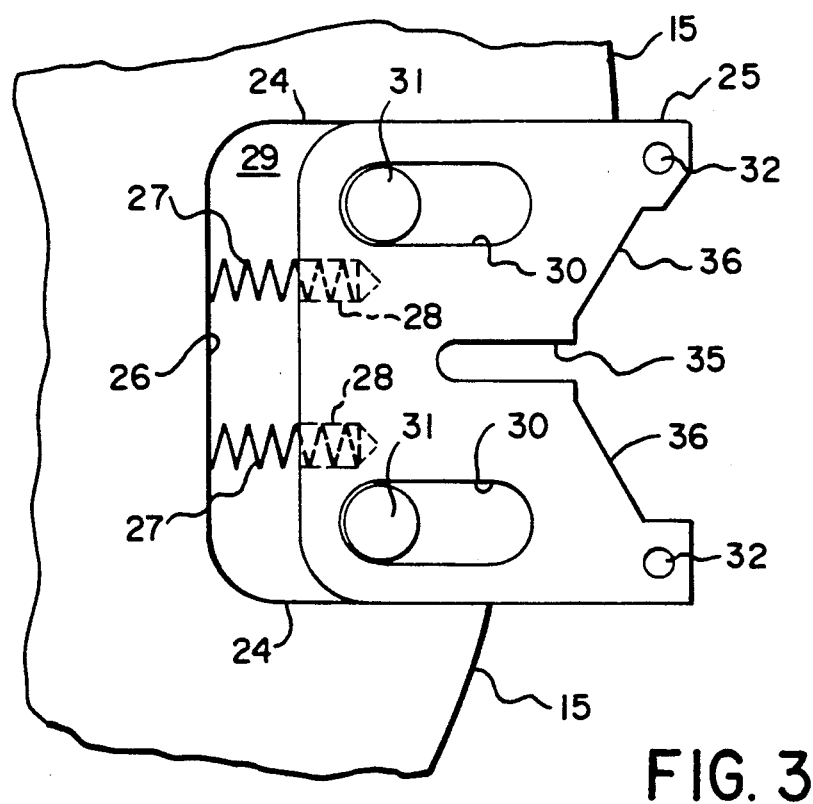
FIG. 3 is an enlarged view of a portion of FIG. 2.
Figure 4:
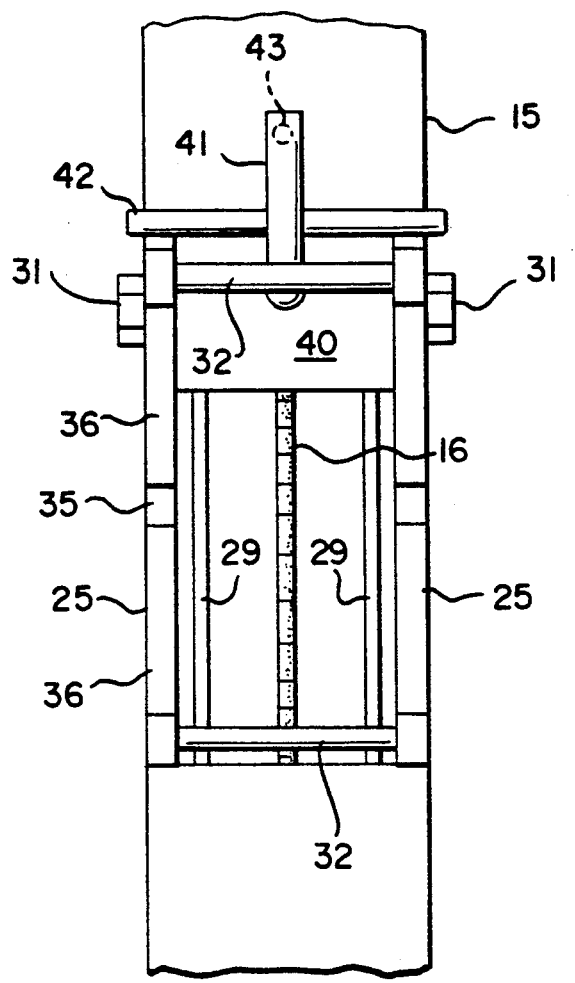
FIG. 4 is an end elevational view taken from the right hand end of FIG. 3.

In the operation of the apparatus, the rotary cutting blade 16 moves upwardly through the key, i.e. counterclockwise as shown in FIG. 2. Thus, apart from lateral movement of the cutting chips, there could be a problem with chips thrown upwardly, but not with respect to chips thrown downwardly. To collect such chips, there may be provided a suitable arrangement, as shown in FIGS. 4 and 7 (and omitted from the other views for purposes of clarity), a flap 40 which extends downwardly behind the upper spacer bar 32. This flap 40 is connected to a lever 41 which is in turn attached to a pivot pin 42, permitting the flap 40 to pivot about the axis of pivot pin 42. The upper end of pin 41 is connected through a spring 43 to a portion of housing 15. This arrangement biases the flap 40 outwardly toward the key. When the plates 25 move rearwardly relative to the housing (or more accurately, the housing moves forwardly relative to the doors which have already stopped against front jaw surfaces 37), the spacer bar 32 will move the flap 40 rearwardly, and upon forward movement to the left of the doors 25, the flap 40 is again free to move forwardly about the axis of pivot pin 42.

FIG. 6 illustrates the shaft opening 45 for passage of the rotary cutter blade shaft from housing 15 to spindle block 20. No opening is necessary in the opposite side of housing 15 since the end of this shaft may be mounted on a bushing located on the inner surface of the housing 15.

The apparatus of the present invention operates as follows. When the turntable 10 has brought a key, e.g. key 12, into position adjacent the cutting station 14, the key is preferably held fixed at all times while all relative movements as between the cutting blade 16 and the key are effected by movements of the cutting blade in the X and Y directions, as previously programmed. According to such program, the cutting blade will move inwardly, i.e. the spindle block 20, the housing 15, and all elements connected thereto, will move inwardly toward the key along a sliding mechanism provided on platform 21 which itself remains stationary. At a first position, a notch of a predetermined depth is cut. The movable mechanisms 15 and 20 then move rearwardly in the Y direction and then laterally in the X direction to prepare to cut the next notch. A suitable sliding mechanism would also be provided between the fixed platform 21 and the spindle block 20 for suitable sliding movement of the latter on the former. Once the elements 15 and 20 have moved to the left in the X direction adjacent the next notch position, these elements would then move inwardly to cut a notch of a predetermined depth at the next position. This procedure would then be continued until all notches were cut in this particular key.

FIGS. 2, 6 and 7 illustrate the position of the plates 25 relative to the housing 15 prior to engagement with the key. In this position, each plate is spring biased by springs 27 to its forwardmost position, as limited by engagement of the rearward end of slots 30 with mounting pins 31.

Figure 5:
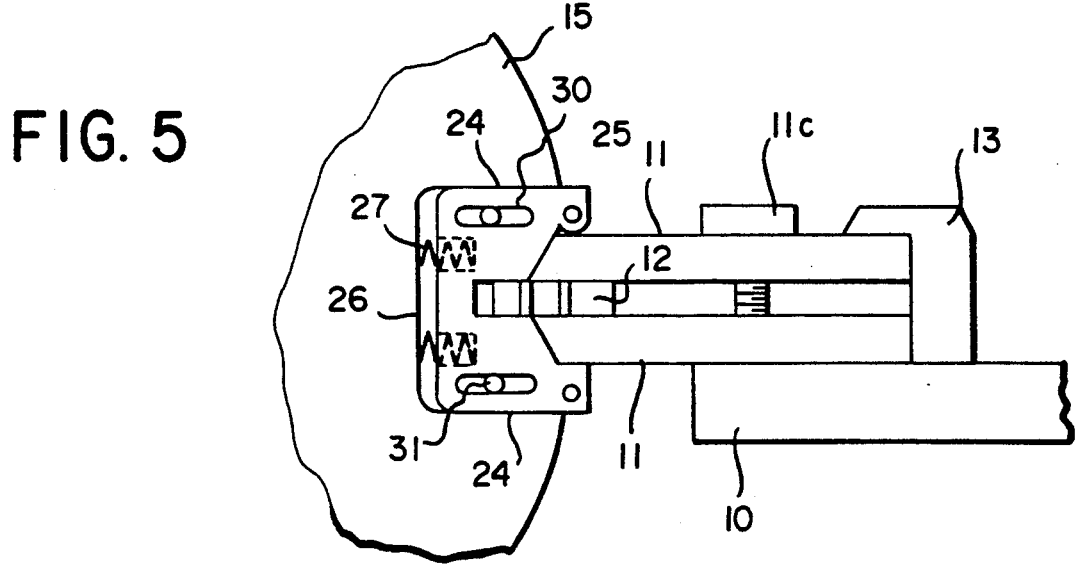
FIG. 5 is a side elevational view similar to FIG. 2 but showing only a portion thereof and showing the parts in a different position.

As the housing 15 and block 20 then move to the key, the ramps 36 engage and mate with the front jaw surfaces 37. Since the plates are then prevented from further movement toward the key, continued movement of housing 15 and spindle block 20 then cause springs 27 to compress while allowing the cutting blade to reach and cut into the key. FIG. 5 illustrates the position of the elements in the cutting position with the housing 15 and its associates elements located toward the right with the plates 25 thereby slid back to the left, relative to the housing 15, compressing the springs 27. It will be noted that in this cutting position, as shown in FIG. 5, the ramps 36 of the plates 25 mate with the front jaw surfaces 37 of the clamp, thereby essentially sealing off the sides of the cutting area and directing all chips which would otherwise be thrown to the sides into the housing 15 to be removed through tube 18.

Meanwhile, if the flap 40 is used, as shown in FIG. 5, it would pass inside of the upper spacer bar 32 and against the top front jaw surface 37, preventing any chips which are carried upwardly by the cutting blade from being thrown outwardly through the space between the plates 25 and above the upper clamping jaw.

Although the invention has been described in considerable detail with respect to the preferred embodiments thereof, it will be understood that the invention is capable of numerous modifications and variations, apparent to those skill in the art, without departing from the spirit and scope of the invention.

I claim:

1. An apparatus for cutting notches into the edge of a key, comprising:
   a clamp for holding a key to be cut, said clamp including front jaw surfaces,
   a rotary key cutter,
   means mounting the rotary cutter for movement, relative to the key, (1) towards and away from the key and (2) along the edge of the key,
   a housing generally enclosing the cutter and a vacuum line for removing cutting chips which enter the cutting housing,
   a pair of doors mounted for sliding movement on each side of the front of the housing in the vicinity where the cutter engages the key, each door being spring biased towards the clamp, and stop means on the housing limiting forward movement of the doors,
   the front edges of the doors being shaped to mate with and stop their forward movement against said front jaw surfaces of the clamp, while further forward movement of the cutter and the housing continues, against the bias of said springs, thus closing off on each side the front vicinity where the cutter engages the key, thereby directing cutting chips created in that area into the housing.

2. An apparatus according to claim 1, wherein the housing includes a front edge above the vicinity where the cutter engages the key, and including a flap connected to said housing near said front edge and extending downwardly therefrom to direct cutting chips which are thrown upwardly between the doors back into the housing.

3. An apparatus according to claim 2, including spacer bars extending across and interconnecting the two doors which are located on each side of the housing.

4. An apparatus according to claim 3, said flap being mounted on the housing and spring biased to an operative closing rest position and pivotable away from said rest position by said spacers.

5. An apparatus according to claim 1, each door comprising a plate which fits into an indented recess formed as a thinner side wall portion in the outer side on each side of the housing, such that the thinner side wall portions rearward of the plates close off that area of the housing when the doors are moved forwardly.

6. An apparatus according to claim 5, wherein the mounting of the doors for sliding movement comprise mounting pins extending from the thin side wall portions through elongated slots in the door.

* * * * *